3,558,554
Patented Jan. 26, 1971

3,558,554
OXIDATIVELY STABLE POLYOLEFIN
COMPOSITION
Tsuneto Kuriyama, Fukuoka, and Toshihiko Kuroda, Shigeru Tanba, and Tetsuzo Murakami, Yokkaichi-shi, Japan, assignors to Yoshitomi Pharmaceutical Industries, Ltd., Osaka, Japan, and Mitsubishi Petrochemical Co., Ltd., Tokyo, Japan
No Drawing. Filed June 8, 1967, Ser. No. 644,499
Claims priority, application Japan, June 9, 1966, 41/36,917
Int. Cl. C08f 45/58
U.S. Cl. 260—45.85                    2 Claims

ABSTRACT OF THE DISCLOSURE

A polyolefin composition containing as a stabilizer, alone or with other stabilizers, an organo phosphite having the following general formula:

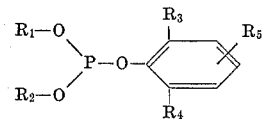

wherein $R_1$ and $R_2$ each represents a member selected from the group consisting of substituted and unsubstituted alkyl, cycloalkyl, aryl, alkaryl, aralkyl, and aliphatic thio ether groups and $R_3$, $R_4$ and $R_5$ each represents a member selected from the group consisting of hydrogen and alkyl, cycloalkyl, aryl, alkaryl and aralkyl groups, at least one of said $R_3$ and $R_4$ being a tertiary butyl group.

Suitable organo phosphites include, for example, di-n-butyl (2-t-butyl-cresyl)phosphite di-n-hexyl(2-t-butyl-m-cresyl)phosphite, di-n-hexyl(2-t-butyl-p-cresyl)phosphite, di-n-octyl(2-t-butyl-p1cresyl)phisphite, di-n-butyl 3,4-di-t-butyl-phenyl)phosphite, di-n-butyl-(2,6-di-t-butyl-p-cresyl)phosphite, di-phenyl(2-t-butyl - p - cresyl)phosphite, tri-(2-t-butyl-p-cresyl)phosphite, di - (ethylthioethyl)-(2-t-butyl-p-cresyl)phosphite, di-(octylthioethyl) (2-t-butyl-p-cresyl)phosphite, and tri(2,4 - di-t-butyl-phenyl)phosphite.

BACKGROUND OF THE INVENTION (1) Field of the invention

The present invention relates to a stabilized polyolefin composition and, more particularly, to a polyolefin composition containing a small amount of a specific organophosphorous acid compound having less tendency to be hydrolyzed.

(2) Description of the prior art

In general, polyolefins are deteriorated by the action of oxygen in air, under high temperature conditions, or on exposure to sunlight, and undesirable phenomena such as discoloration, formation of surface cracks, or reduction in mechanical strength will occur. It is well known that to prevent the occurrence of such deterioration phenomena, a phenolic compound, an aromatic amine compound, a sulfur-containing compound or an organic phosphorous compound, etc., may be added to polyolefins.

It is also known that among these additives, the organophosphorous acid compound having the following general formula:

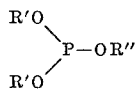

wherein R' and R" represent same or different hydrocarbon groups, such as substituted or unsubstituted alkyl, cycloalkyl, aryl, alkaryl, or aralkyl groups, is effective in presenting deterioration by thermal oxidation, as well as in preventing deterioration by light, and improving the color. However, such an organophosphorous acid compound has a major drawback in that the compound is easily hydrolyzed when brought into contact with water or steam, thus markedly reducing its deterioration preventing effect. For example, it is known that triphenyl phosphite is hydrolyzed by the following reaction:

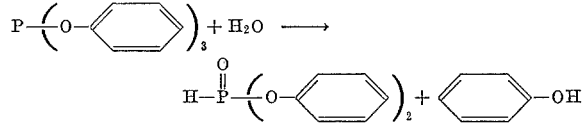

The compounds thus formed are almost entirely lacking in stabilizing power, and sometimes it happens that they even promote the deterioration of polyolefins.

In fact, when a polyolefin composition containing triphenyl phosphite is placed in a closed vessel of 100% in humidity, the change in melt index and the reduction in thermal stability of the polyolefin composition is remarkable, as compared with a composition containing no phosphorous compound. Hence, it is undesirable to maintain such a polyolefin compound, containing triphenyl phosphite, in water in a high humidity condition for a long period of time.

SUMMARY OF THE INVENTION

The inventors have found, as the results of various investigations of the above-mentioned hydrolyzing property, that the hydrolyzing property of a trialkyl phosphite is remarkably reduced by substituting at least one alkyl group of the trialkyl phosphite by a phenyl group, and introducing to the ortho-position of the phenyl group a three-dimensionally large substiutent, such as a tertiary butyl group.

Therefore, an object of the present invention is to provide a polyolefin composition having high stability to deterioration by oxidation, caused by heat and light irradiation. It is also an object to prevent discoloration and provide a material which is stable for a long period of time in water or under high humidity conditions. Another object of this invention is to provide a polyolefin composition containing an organo phosphite having a high hydrolysis resistance even in water or in a high humidity condition.

The polyolefin compositions of this invention contain at least one organo phosphite represented by the following general formula:

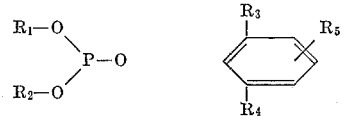

wherein $R_1$ and $R_2$ represent substituted or unsubstituted alkyl groups, cycloalkyl groups, aryl groups, alkaryl groups, aralkyl groups, or aliphatic thio ether groups; and $R_1$ and $R_2$ may be same or different groups; $R_3$, $R_4$ and $R_5$ represent hydrogen, alkyl groups, cycloalkyl groups, alkaryl groups, or aralkyl groups; $R_3$, $R_4$ and $R_5$ may be same or different groups; and at least one of $R_3$ and $R_4$ is a tertiary butyl group. The organo phosphite is added in an amount of 0.01–10% by weight and preferably 0.05–2% by weight.

Typical examples of trialkyl phosphites having a stabilization power when incorporated in the polyolefin composition of this invention are as follows:

Di-n-butyl(2-t-butyl-p-cresyl)phosphite,
Di-n-hexyl(2-t-butyl-m-cresyl)phosphite, Di-n-hexyl(2-t-butyl-p-cresyl)phosphite,
Di-n-octyl(2-t-butyl-p-cresyl)phosphite,
Di-n-butyl(2,4-di-t-butyl-phenyl)phosphite,
Di-n-butyl(2,6-di-t-butyl-p-cresyl)phosphite,
Di-phenyl(2-t-butyl-p-cresyl)phosphite,
Tri-(2-t-butyl-p-cresyl)phosphite,
Di-(ethylthioethyl)(2-t-butyl-p-cresyl)phosphite,
Di-(octylthioethyl)(2-t-butyl-p-cresyl)phosphite, and
Tri-(2,4-di-t-butyl)phosphite.

In the polyolefin composition of this invention, the above-mentioned organo phosphites are usually incorporated together with other stabilizers which are capable of stabilizing polyolefins against deterioration by heat, light and oxidation. They include, for example, an antioxidant, such as a phenolic compound, an aromatic amine compound, and thio di-aliphatic acid esters. Metallic soaps used in polyolefins for catching acid components and corrosive components formed from the decomposition product of catalysts, and ultraviolet absorbers may also be used concurrently with the present additives. By using the organophosphites of this invention together with these stabilizers, a polyolefin composition having a higher stability is generally obtained.

Moreover, any other additives for improving the properties of polyolefins, such as pigments, fillers, e.g., carbon black, may be incorporated in the polyolefin composition of this invention if desired.

The term "polyolefin" in the specification of this invention means a polymer or a copolymer of olefins, such as ethylene, propylene, butene-1, 3-methyl-butene-1, pentene-1, 4-methylpentene-1, 3,3-dimethylbutene-1, octene-1, decene-1, and the like or a mixture of the polymers or the copolymers of such olefins.

The addition components may be added, in the present invention, to a polyolefin or polyolefin composition containing other additives by using a proper mixer, such as a Banbury mixer, a roll mixer, or an extruder.

DETAILED DESCRIPTION OF THE INVENTION

The invention will now be explained more practically by the following examples, but it should be understood that the invention is not limited to these examples.

Example 1.—Compositions were prepared by mixing 0.05% by weight of 1,1,3-tri(2-methyl-4-hydroxy-5-t-butyl-phenyl)butane and 0.2% by weight of dilauryl thiodipropionate (DLTDP), as an antioxidant, in isotactic polypropylene powders (the intrinsic viscosity of it in Tetralin at 138° C. was about 20), and further mixing therein 0.1% by weight each of triphenyl phosphite, tristearyl phosphite and di-n-butyl(2-t-butyl-p-cresyl)-phosphite respectively as organo phosphites was pelletized by means of an extruder.

The pellets thus obtained were subjected to a weathering stability test by a carbon arc Weather-O-Meter on an 0.5 mm. thick sheet pressed from the pellets. In the weathering stability test, the sample was considered to be deteriorated when a brittle rupture was observed by a bending test of the sheet. A heat resistance test was also conducted by measuring the induction period of oxygen absorption at 160° C. of a film formed from the pellets, a thickness of 0.1 mm.

Further, in the test for stability of water and humidity, the sample pellets were preserved in a closed vessel at 100% humidity for 40 days. Thereafter, the melt index and the induction period of oxygen absorption were measured.

The results of these tests are shown in the following table.

TABLE 1

| Sample No. | Additive | Melt index at 230° C. | | Induction period of $O_2$-absorption, min. (at 160° C.) | | Weathering stability, hrs. (life time) |
| --- | --- | --- | --- | --- | --- | --- |
| | | (A) | (B) | (C) | (D) | |
| 1 | None | | | 30 | 30 | 20 |
| 2 | 1,1,3-tri(2-methyl-4-hydroxy-5-t-butylphenyl)-butane (0.05%) plus DLTDP (0.2%). | 3.4 | 3.7 | 1,600 | 1,300 | 200 |
| 3 | Above (2) plus triphenylphosphite | 2.4 | 4.7 | 1,700 | 600 | 250 |
| 4 | Above (2) plus tristearylphosphite (0.1%) | 2.4 | 4.5 | 1,600 | 700 | 240 |
| 5 | Above (2) plus di-n-butyl (2-t-butyl-p-cresyl)phosphite (0.1%) | 2.3 | 2.4 | 1,700 | 1,200 | 250 |

In the above table, the capital letters at column headings indicate samples at the following different stages: (A) At the preparation of sample; (B) Humidity 100% after 40 days; (C) At the preparation of sample; (D) Humidity 100%, after 40 days.

As shown in the above table, the compositions (3) and (4) containing triphenyl phosphite and tristearyl phosphite respectively, showed increased melt indices and shortened induction periods of oxygen absorption after being placed in a closed vessel at 100% humidity for 40 days, but the polypropylene composition (5) of the invention containing di-n-butyl 2-t-butyl-p-cresyl phosphite retained sufficient stability even after 40 days.

Example 2.—As in Example 1, 0.05% by weight of 1,1,3 - tri(2 - methyl - 4 - hydroxy-5-t-butylphenyl)butane, 0.2% of dilaurylthio di-propionate and 0.1% by weight of each of the organo phosphites, three-dimensionally protected as shown in the following table, were mixed with isotactic polypropylene powders and then the composition was pelletized by an extruder.

Also, as in Example 1, the samples were placed in a closed vessel of 100% in humidity for 40 days and evaluation was done by measuring the melt index before and after the humidity test, and testing the weathering life time.

The results are shown in the following table:

TABLE 2

| Sample No. | Additive | Melt Index at sample making | After 40 days | Weathering life time, hrs.[1] |
| --- | --- | --- | --- | --- |
| 1 | 1,1,3-tri(2-methyl-4-hydroxy-t-butylphenyl)-butane (0.05%) plus DLTDP (0.2%). | 5.2 | 6.0 | 210 |
| 2 | Above (1) plus triphenylphosphite (0.1%) | 5.4 | 8.3 | 260 |
| 3 | Above (1) plus di-n-octyl-(2-t-butyl-p-cresyl)-phosphite (0.1%) | 4.4 | 5.0 | 250 |
| 4 | Above (1) plus di-n-butyl-(2,4-di-t-butylphenyl)-phosphite (0.1%) | 5.1 | 5.5 | 250 |
| 5 | Above (1) plus di-n-butyl(2,6-di-t-butyl-p-cresyl) phosphite (0.1%) | 4.3 | 4.5 | 270 |
| 6 | Above (1) plus di-phenyl(2-t-butyl-p-cresyl) phosphite (0.1%) | 5.1 | 5.8 | 250 |
| 7 | Above (1) plus tri(2-t-butyl-p-cresyl) phosphite (0.1%) | 4.0 | 4.3 | 270 |
| 8 | Above (1) plus di(ethylthioethyl)(2-t-butyl-p-cresyl)-phosphite (0.1%). | 4.3 | 5.1 | 250 |
| 9 | Above (1) plus di(octylthio-ethyl)(2-t-butyl-p-cresyl) phosphite (0.1%). | 4.2 | 5.2 | 260 |

[1] Before exposure to humidity.

In Table 2, Samples 1 and 2 are conventional products and Samples 3 to 9 are the compositions of this invention.

What is claimed is:

1. A polyolefin composition consisting essentially of a member selected from the group consisting of polyethylene, polypropylene and polymers of butene-1, 3-methylbutene-1, pentene-1, 4-methylpentene-1, 3,3-dimethylbutene-1, octene-1, decene-1, mixtures thereof and copolymers thereof, said composition containing a stabilizing amount of an organo phosphite selected from the group consisting of di-n-butyl(2-t-butyl-p-cresyl)phosphite,
di-n-hexyl(2-t-butyl-m-cresyl)phosphite,
di-n-hexyl(2-t-butyl-p-cresyl)phosphite,
di-n-octyl(2-t-butyl-p-cresyl)phosphite,
di-n-butyl(2,4-di-t-butyl-phenyl)phosphite,
di-n-butyl-(2,6-di-t-butyl-p-cresyl)phosphite,
di-phenyl(2-t-butyl-p-cresyl) phosphite,
tri-(2-t-butyl-p-cresyl)phosphite,
di-(ethylthioethyl)-(2-t-butyl-p-cresyl)phosphite,
di-(octylthioethyl) (2-t-butyl-p-cresyl)phosphite, and
tri(2-4-di-t-butylphenyl)phosphite, wherein said composition further contains a small amount of 1,1,3 - tri(2 - methyl-4 hydroxy-5-t-butylphenyl)butane and di-lauryl thiodipropionate, as antioxidants.

2. The polyolefin composition as in claim 1, wherein the amount of said organo phosphite is from about 0.05 to 2% by weight.

References Cited

UNITED STATES PATENTS 3,255,151    6/1966    Hecker _____ 260—45.7

FOREIGN PATENTS 803,557    10/1958    Great Britain _____ 260—45.7
1,006,595   10/1965    Great Britain _____ 260—45.85

DONALD E. CZAJA, Primary Examiner

V. P. HOKE, Assistant Examiner

U.S. Cl. X.R.

260—45.7, 45.95